May 7, 1946.　　　　O. C. MOLL　　　　2,399,933
CONDUIT CONNECTOR
Filed May 27, 1942　　　　2 Sheets-Sheet 1
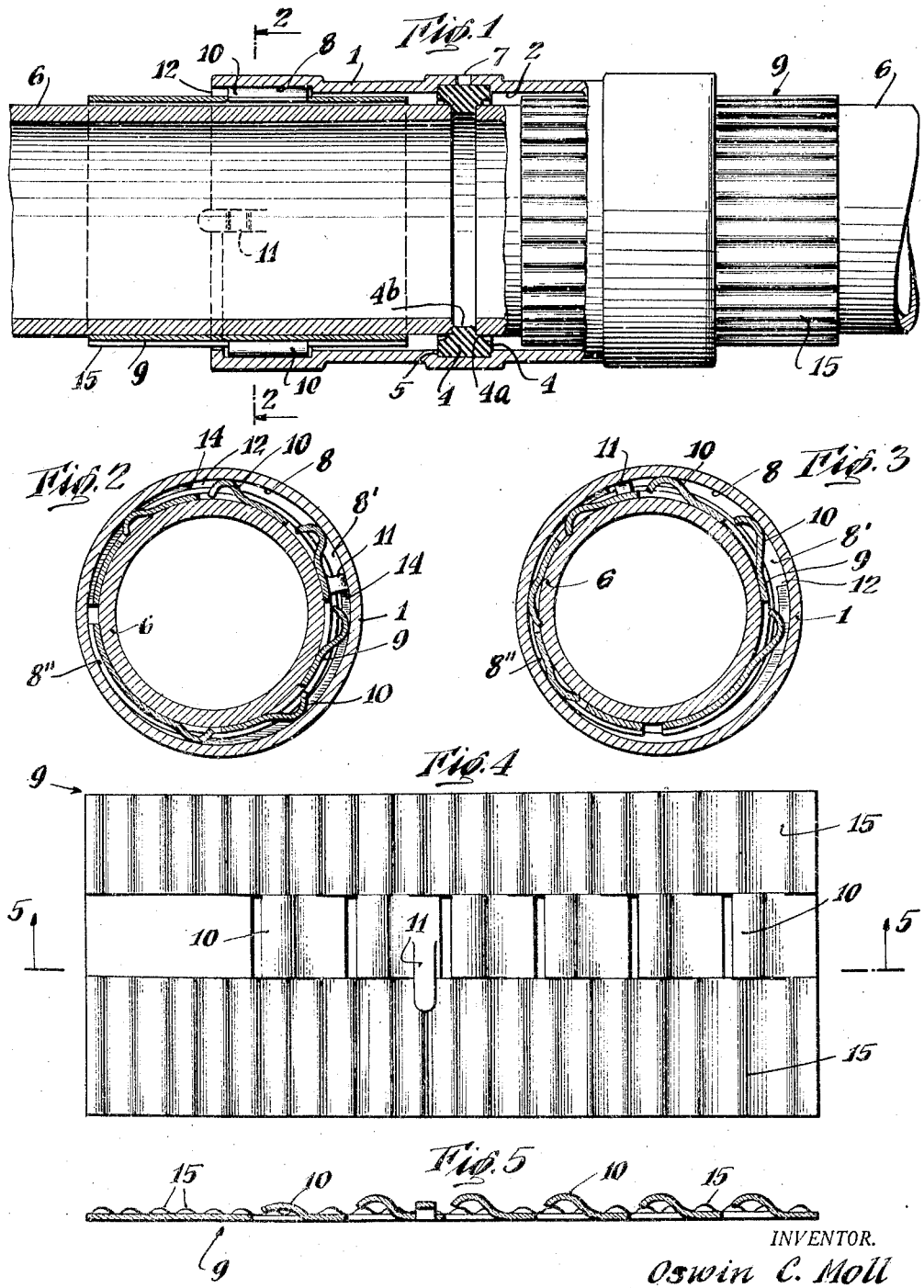
INVENTOR.
Oswin C. Moll
BY
Norman N. Holland
ATTORNEY

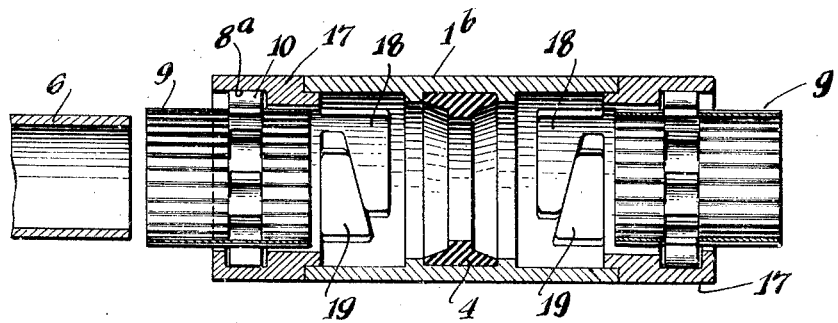
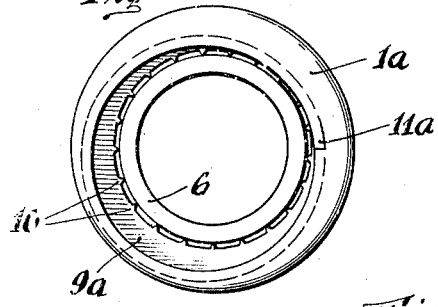
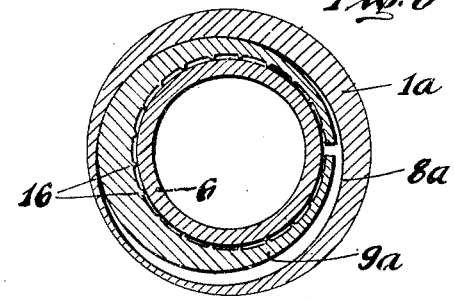
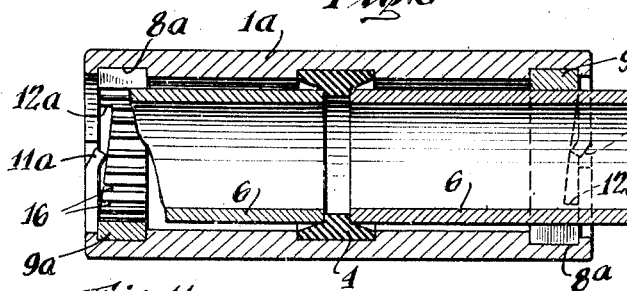
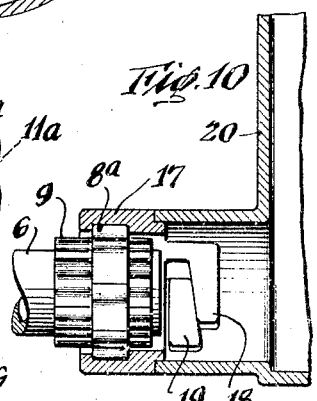
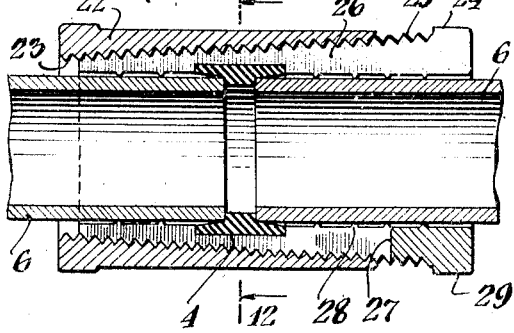
INVENTOR.
Oswin C. Moll Patented May 7, 1946

2,399,933

UNITED STATES PATENT OFFICE 2,399,933

CONDUIT CONNECTOR

Oswin C. Moll, Manhasset, N. Y.

Application May 27, 1942, Serial No. 444,752

16 Claims. (Cl. 285—193)

The present invention relates to couplings and more particularly to an improved means for coupling the ends of two conduits, for example, electrical conduits or for attaching an end of a conduit to a fitting. This application is a continuation in part of my prior application, Serial No. 406,076, filed August 9, 1941, now Patent No. 2,334,687, granted November 16, 1943.

A common type of electrical conduit is an iron pipe. The pipe is made in standard lengths and joined together to reach from one point to another. In many instances, pieces shorter than the regular lengths are required and, in accordance with the present practice, the standard length of pipe has to be cut and threaded on the job for connection with another pipe. The threading operation requires considerable time particularly when it has to be done at locations where automatic machinery is not available. This, of course, increases the cost; in addition, considerable time is required to thread the end of the pipe into the connecting sleeve after the thread is formed. The thickness of the pipe has to be sufficiently great to permit it to be threaded at any point, thus requiring a thicker and more expensive pipe than would be necessary if the threading operation could be eliminated. Various attempts have been made to eliminate the threading operations but they have not been commercially successful. Conduits in use today follow generally the old practice of threading standard lengths of pipe and connecting them with a threaded sleeve, in spite of the conceded objections thereto.

The present invention aims to overcome the above difficulties by providing an improved coupling means, effective upon the smooth ends of pipes, whereby the threading operation may be eliminated and a thinner pipe utilized. In addition, the invention reduces substantially the time required in securing the ends of two pipes in a connecting sleeve.

An object of the present invention is to provide a simple and effective connecting sleeve for connecting the ends of pipes used for electrical conduits.

Another object of the invention is to provide improved means readily applicable to existing pipes and capable of holding them securely in position.

Another object of the invention is to provide an improved means for securing the end of a pipe to various fitments.

Another object of the invention is to reduce the time required for securing together the ends of two pipes used as conduits.

Another object of the invention is to reduce the cost of manufacture of an effective connector.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a longitudinal sectional view through a preferred embodiment of the invention;

Fig. 2 is a sectional view along the line 2—2 of Fig. 1, showing the position of the parts as they are assembled prior to their being turned for the locking action;

Fig. 3 is a sectional view corresponding to Fig. 2, showing the position of the parts after they have been rotated substantially ninety degrees to lock a pipe in position;

Fig. 4 is a plan view of the locking member in strip form prior to its being bent to fit into the cylindrical sleeve;

Fig. 5 is a sectional view of the strip along the line 5—5 of Fig. 4;

Fig. 6 is a longitudinal sectional view of another embodiment of the invention;

Fig. 7 is a sectional view along the line 7—7 of Fig. 6 illustrating the parts prior to being locked in position;

Fig. 8 is a sectional view similar to Fig. 7 illustrating the position of the parts when the pipe is locked in position;

Fig. 9 is a longitudinal sectional view of another embodiment of the invention;

Fig. 10 is a sectional view illustrating the embodiment of Fig. 9 applied to a fitting;

Fig. 11 is a longitudinal sectional view of another embodiment of the invention; and Fig. 12 is a sectional view along the line 12—12 of Fig. 11.

Referring again to the drawings and more particularly to the embodiment in Figs. 1 to 3 thereof, there is shown a sleeve or connector member 1 having a cylindrical bore 2 therein. A suitable annular gasket 4 may be seated in an annular recess 5 for engaging and sealing the ends of pipes 6 adapted to be connected together within the connector member 1. The gasket 4 is illustrated as a ring of vulcanized rubber with inclined sides 4a leading up to a central portion 4b. The ends of the pipes are forced up over the tapered parts until a tight fit is made with the central portion. It will be understood that other types and shapes of sealing means may be used; for example, an aperture 7 may be provided for flowing a plastic sealing compound within the connector after the connection is made. Such a sealing compound can be flowed in or forced in to seal the ends of the pipes. Where a vulcanized gasket is utilized, the aperture 7 may be omitted.

The ends of the member 1 are provided with annular recesses 8. Where the sleeve member 1 is made of sheet material, the recesses 5 and 8 may be rolled in. Where a casting is used, the recesses may be cast or reamed therein. Since the two ends of the connector are alike in construction and operation, only one end will be described. The inner surface of the recess 8 preferably is circular but eccentric with respect to the bore 2 of the sleeve. A locking member 9 is provided having a series of tongues 10 bent as illustrated more particularly in Figs. 2 and 3. The width of the tongues 10 is slightly less than the width of the annular recess 8 in order to fit therein. The outer convex portions of the tongues engage the periphery of the recess 8 and as the locking member is rotated within the sleeve 1 the eccentricity of the recess 8 forces the ends of the tongues 10 into firm locking action with respect to the pipe 6 therein. This is shown more particularly in Figs. 2 and 3 of the drawings. It will be noted in Fig. 2 that the pipe is concentric with respect to the sleeve 1. As the locking member 9 is rotated, the locking tongues 10 pass from the deep portion 8' of the annular recess 8 to the shallow portions 8'' thereof. Thus, the tongues 10 are pressed firmly into engagement with the pipe to lock it in position. It will be noted in Fig. 2 that the tongues 10 are in the deep portions 8' of the annular recess 8 whereas in Fig. 3, the locking member 9 has been rotated until the tongues 10 are in the shallow portions 8'' of the recess and thereby forced into locking engagement with the pipe. Preferably the tongues are curved to different extents and are sufficiently flexible so that they will bend slightly under the locking pressure, thereby giving a more nearly equal distribution of the locking action without limiting tolerance variations unduly. In order to facilitate assembly, a stop 11 is provided on the locking member and a cooperating recess 12 is provided in the end of the sleeve with stops 14 at the ends thereof. The stop member will move along the recess 12 and will engage one end thereof in the assembly position, that is, when the tongues are in position to engage the deep part of the annular recess 8. The locking member can then be rotated only in the direction for locking; in addition, the stop member serves as an indication of the proper position of the locking member for the easy insertion of a pipe therein.

While the locking member 9 may be made in any suitable fashion, a preferred method is illustrated in Figs. 4 and 5. As there illustrated, the locking member may be stamped from sheet metal and simultaneously with the stamping operation, the tongues 10 may be formed and bent into their proper curved shape. At the same time, corrugations 15 may be formed in the portions adjacent the sides of the tongues, thereby to strengthen the locking member and also to facilitate gripping it by means of a wrench or otherwise for rotation to securely lock the parts in position. While the tongues may be formed at one side of the locking member, in the preferred embodiment, a continuous portion is provided at each side of the tongues, one part extending outside of the sleeve 1 to facilitate assembly and the other extending inside of the sleeve beyond the recess 8 to assist in centering the pipe within the sleeve by partly filling the clearance space between the sleeve and the pipe. Preferably the locking member 9 is bent into circular form and inserted into the connector sleeve 1 by the manufacturer, thus enabling the electrician to receive assembled units.

In the operation of the embodiment illustrated in Figs. 1 to 5, the locking member 9 is rotated until the stop 11 engages the proper end 14 of the recess 12. In this position, the tongues 10 of the locking member will be in the deep portion of the annular recess 8. The pipes may then be readily inserted into the ends of the sleeve as the locking member is in proper position to permit it. Thereafter, the pipes are pressed until they are in secure engagement with the gasket 4 at the middle of the sleeve and then the locking members are rotated approximately ninety degrees to securely lock the pipes in position. Preferably both the pipes and the locking members are rotated together during the locking operation. The more the pipe and locking member are turned, the tighter the pipe is clamped in position. Thus the pipes may be locked securely in position, without the requirement of threads on the ends thereof, by a simple quarter turn of the locking member. By reason of the eccentricity of the recess, any desired amount of leverage can be obtained to assure effective results. By omission of threads on the pipe, a thinner pipe may be used and thus a substantial saving of material is effected. In addition, the time required for connecting two pipes is reduced materially. The flexibility of the locking member permits substantial tolerance variations without impairing the operation.

The construction illustrated in Figs. 6, 7 and 8 differs from that illustrated in the preferred embodiment, primarily in the construction of the locking member 9a. The latter in Figs. 6, 7 and 8 is provided with an inner bore which is eccentric with respect to its outer circular periphery. In addition, the inner bore has a series of ribs or projections 16 which engage and hold the pipe. The annular recesses 8a in the sleeve member are preferably eccentric with respect to the inner bore. The connector member 1a is illustrated as cast and the annular recesses are shown reamed or cast therein. A stop 11a is provided on the flange of the connector member to fit into a recess 12a in the locking member 9a. In this way, the locking member 9a may be quickly fixed in the position where its inner bore is concentric with the inner bore of the connector to facilitate assembly. In the operation of the embodiment, the locking member 9a is rotated until the stop 11a engages the end of the recess 12a in which position the bore thereof is concentric with the bore of the connector. The pipes 6 are then inserted until they abut the annular gasket 4. The pipes are then rotated and they carry with them the locking members 9a from the position illustrated in Fig. 7 to that illustrated in Fig. 8; where the pipes are firmly locked together.

In the embodiment illustrated in Fig. 9, the locking members 9 are formed in a separate member 17, which is adapted to be secured to a sleeve 1b by means of a bayonet joint formed by the projection 18 on the member 17, engaging a cooperating projection 19 on the sleeve 1b. The operation of the bayonet joint should be such that the rotation of the pipe in an assembly operation will be in a direction to increase the locking action of the bayonet joint and not in the direction to unlock it. In the removal of the pipes from the connector, either the bayonet joint or the locking member is released. In either case, the pipes may be removed. The operation of the member in other respects is the same as that described with respect to the embodiment in Figs. 1 to 5.

The embodiment in Fig. 10 illustrates the locking mechanism 17 of Fig. 9 applied to a fitting 20. The fitting 20 has a projection 19 thereon which serves to cooperate with the projection 18 on the locking member 17 to securely fix it in position thereon. The parts of the locking mechanism and the operation thereof are the same as described with respect to Fig. 9.

In the embodiment illustrated in Figs. 11 and 12, an outer sleeve 22 has a tapered bore with a thread 23 formed on the interior thereof. A second sleeve 24 having a tapered outer surface threaded at 25 is adapted to be threaded into the outer sleeve 22. The inner sleeve 24 is slotted throughout its length as shown at 26 (Fig. 12) and is slotted for a portion of its length at other points 27 to facilitate constriction thereof. Preferably a resilient gasket 4, similar to the gasket in Fig. 1, is provided at the middle of the inner sleeve. The ends of the two conduit pipes 6 may be inserted therein until the ends engage the gasket 4. The two sleeves 22 and 24 are then rotated relative to each other to thread them together. The tapered threaded portions thereof cause the inner sleeve 24 to contract and to clamp the ends of the pipe rigidly in position. The annular ridges 28 on the inside of the sleeve 24 increase the effectiveness of the grip on the pipe. The degree of taper determines the amount of clamping action with the usual wrenches applied to the polygonal portions 29.

The operation of the several embodiments has been described in connection with each and a further description of the operation at this point would be repetitious.

It will be seen that the present invention provides a construction for securing together the ends of pipes, such as are used for electrical conduits, with a minimum of time and effort. The threading operation with respect to the ends of the pipe is eliminated, thereby further reducing the cost thereof. Secure clamping action is obtained by rotating the pipe about one-quarter of a revolution, thus simplifying the operation. The device is simple in construction and easy to manufacture at a low cost. The principles thereof are applicable to various forms of connectors. The units are rugged in construction and fully capable of withstanding the rough usage to which they may be subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a device of the class described, the combination of a sleeve and a sheet metal member adapted to fit in said sleeve to lock a pipe in position therein, said member having a series of tongues with free ends extending circumferentially and adapted to engage the sleeve and the pipe by rotation to interlock them.

2. In a device of the class described, the combination of a sleeve and a sheet metal member adapted to fit in said sleeve to lock a pipe in position therein, said member having a series of tongues with free ends extending circumferentially and bent to form convex portions from their outer surfaces which are adapted to engage the interior of the sleeve and said convex surfaces being adapted to serve for forcing the free ends of said tongues into locking engagement with the pipe by rotation.

3. In a device of the class described, the combination of a sleeve having an annular recess therein and a sheet metal member adapted to fit in said sleeve to lock a pipe in position therein, said member having a series of tongues with free ends extending circumferentially and bent to fit into said annular recess with the ends of the tongues bent away from said annular recess to engage by rotation a pipe passing through said sleeve.

4. In a device of the class described, the combination of a sleeve having a bore therein and an annular recess, the bottom of which is eccentric with respect to the bore of the sleeve, and a member adapted to fit in said sleeve to lock a pipe in position therein, said member having a series of tongues bent to fit into said annular recess and to engage the pipe extending into said sleeve to lock the pipe in position when rotated until the eccentricity of said recess becomes effective upon said tongues.

5. In a device of the class described, the combination of a sleeve having a bore therethrough and an annular recess therein, the surface of the bottom of said recess being eccentric with respect to the bore of the sleeve and a member adapted to fit in said sleeve to lock a pipe in position therein, said member having a series of tongues bent to provide a convex exterior surface fitting into said recess with the ends of the tongues projecting inwardly toward the pipe therein to engage the pipe when said member is rotated with respect to said eccentric surface.

6. In a device of the class described, the combination of a sleeve having a bore therethrough and an annular recess therein, the surface of the bottom of said recess being eccentric with respect to the bore of the sleeve and a member adapted to fit in said sleeve to lock a pipe in position therein, said member having a series of tongues bent to fit into said recess with the ends of the tongues projecting inwardly toward the pipe therein to engage the pipe when said member is rotated with respect to said eccentric surface, the bend in said tongues and the extent of the projection into said recess increasing in amount with the successive tongues.

7. In a device of the class described, the combination of a sleeve having a bore therein and an annular recess in said bore, the surface of the bottom of said recess being eccentric with respect to the bore of the sleeve, a member adapted to fit in said sleeve to lock a pipe in position therein, said member having projections for engaging a pipe, means providing a stop for limiting the movement of said member with respect to said sleeve in one direction, thereby to facilitate alignment of the sleeve and the member for assembly, said alignment being in a position in which the eccentricity of the recess is not effective to force the projections against the pipe.

8. In a device of the class described, the combination of a sleeve, an annular gasket in said sleeve having a middle portion adapted to fit between the ends of two pipes and end portions adapted to fit about the ends of two pipes, and a pair of sheet metal members adapted to fit in said sleeve and carrying circumferentially extending tongues to lock the ends of a pair of pipes in position therein, each of said members having a series of projections thereon extending longitudinally of one of the pipes and adapted to engage the said pipe to force said member to lock the pipe by the tongues to rotate with the pipe.

9. In a device of the class described, the combination of a sleeve having an annular recess therein, the surface of the bottom of said recess being eccentric with respect to the outer surface of the sleeve, an annular gasket within said sleeve having a middle portion adapted to fit between the ends of a pair of pipes and having end portions adapted to extend about the abutting ends of said pair of pipes, and a pair of sheet metal members adapted to fit in said sleeve and carrying circumferentially extending tongues to lock said pipes in position therein, each of said members having a series of projections extending longitudinally of one of the pipes to engage the pipe and cause said member to rotate with the pipe to facilitate locking the pipes in position by said tongues.

10. In a device of the class described, the combination of a sleeve, an annular gasket adapted to fit into the sleeve having a middle portion adapted to extend about the ends of two pipes, and a pair of sheet metal members adapted to fit into the sleeve and carrying circumferentially extending tongues to lock the ends of a pair of pipes in position therein, said members having transverse projections thereon adapted to engage one of the pipes and to force said member to rotate with the pipe, thereby to facilitate locking the pipes in position by said tongues.

11. In a device of the class described, the combination of a sleeve member having a threaded tapered bore therein, a metal constrictable member within said sleeve member having a threaded outer tapered surface, an annular gasket in said constrictable member having a middle portion adapted to fit between the ends of two pipes, relative rotation between said sleeve and constrictable members being adapted to constrict said constrictable member to compress said gasket and to lock said pair of pipes in position therein.

12. In a device of the class described, the combination of a connector member having a bore adapted to receive the ends of a pair of pipes, interlocking means on each of the ends of said connector member, and a pair of members having interlocking means thereon adapted to interlock with the interlocking means on the ends of said first member, each one of said pair of members having a recess therein, the bottom surface of which is eccentric to the bore of the connector, and a sleeve in each one of said pair of members having bent tongues fitting in the recesses of each of said pair of members, the eccentric bottom surfaces of said recesses being adapted to force said tongues into engagement with the ends of said pipes to hold them in position.

13. In a device of the class described, the combination of a fitment having a cylindrical opening, interlocking means on said fitment, a connector member having a bore therein adapted to be aligned with said cylindrical opening and also having interlocking means adapted to cooperate with the interlocking means on said fitment, an annular recess in said connector member, the bottom surface of said recess being eccentric with respect to the bore of the connector member, and rotatable means having circumferentially extending tongues in said recess adapted to be forced out of the recess by the eccentric surface for locking a pipe in position in said connector member upon rotation of said means.

14. In a device of the class described, the combination of a sleeve having a bore therein and an annular recess, the bottom of which is eccentric with respect to the bore of the sleeve and a member adapted to fit in said sleeve to lock a pipe in position therein, said member having a series of tongues bent to fit into said annular recess and to engage the pipe extending into said sleeve to lock the pipe in position when rotated until the eccentricity of said recess becomes effective upon said tongues, a second pipe held to the first pipe by the sleeve, and a gasket lying between the pipes and held in an annular recess in the sleeve.

15. In a device of the class described the combination of a sleeve having a bore therethrough and an annular recess therein, the surface of the bottom of said recess being eccentric with respect to the bore of the sleeve and a member adapted to fit in said sleeve to lock a pipe in position therein, said member having a series of tongues bent to provide a convex exterior surface fitting into said recess with the ends of the tongues projecting inwardly toward the pipe therein to engage the pipe when said member is rotated with respect to said eccentric surface, a second pipe held to the first pipe by the sleeve, and a gasket lying between the pipes and held in an annular recess in the sleeve.

16. In a device of the class described, the combination of a sleeve having a bore therethrough and an annular recess therein, the surface of the bottom of said recess being eccentric with respect to the bore of the sleeve and a member adapted to fit in said sleeve to lock a pipe in position therein, said member having a series of tongues bent to fit into said recess with the ends of the tongues projecting inwardly toward the pipe therein to engage the pipe when said member is rotated with respect to said eccentric surface, the bend in said tongues and the extent of the projection into said recess increasing in amount with the successive tongues, a second pipe held to the first pipe by the sleeve, and a gasket lying between the pipes and held in an annular recess in the sleeve.

OSWIN C. MOLL.